(12) United States Patent
Marley et al.

(10) Patent No.: US 6,463,761 B2
(45) Date of Patent: Oct. 15, 2002

(54) METHOD AND APPARATUS FOR MINIMIZING AIR INFILTRATION IN THE PRODUCTION OF FUSED SILICA GLASS

(75) Inventors: Floyd E. Marley, Corning; Mahendra K. Misra, Horseheads; Merrill F. Sproul, Big Flats, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/971,249

(22) Filed: Oct. 3, 2001

(65) Prior Publication Data

US 2002/0014091 A1 Feb. 7, 2002

Related U.S. Application Data

(62) Division of application No. 09/487,011, filed on Jan. 19, 2000, now Pat. No. 6,314,766.

(51) Int. Cl.⁷ .............................................. C03B 19/06
(52) U.S. Cl. ........................ 65/17.4; 65/17.3; 65/144; 65/413; 65/414; 65/416; 65/DIG. 8
(58) Field of Search .................................. 65/17.2, 17.3, 65/17.4, 144, 302, 413, 414, 416, DIG. 8

(56) References Cited

U.S. PATENT DOCUMENTS

| | | | | |
|---|---|---|---|---|
| 4,259,101 A | * | 3/1981 | Tsukuda et al. | ............... 65/144 |
| 4,428,762 A | * | 1/1984 | Andrejco et al. | ............. 65/144 |
| 4,740,226 A | | 4/1988 | Toda | ........................... 65/144 |
| 5,043,002 A | | 8/1991 | Dobbins et al. | ............... 65/413 |
| 5,152,819 A | | 10/1992 | Blackwell et al. | ............. 65/413 |
| 5,696,038 A | | 12/1997 | Maxon | .......................... 501/54 |
| 5,698,484 A | | 12/1997 | Maxon | .......................... 501/54 |
| 5,951,730 A | | 9/1999 | Schermerhorn | .............. 65/17.3 |

FOREIGN PATENT DOCUMENTS

EP      0 861 812      9/1998      ........... C03B/19/14

* cited by examiner

Primary Examiner—Michael Colaianni
(74) Attorney, Agent, or Firm—Burton Turner; Timothy M. Schaeberle

(57) ABSTRACT

Fused silica boules (19) having improved radial homogeneity are produced by controlling the air flow around the boule (19) during its formation. The boule is formed in a cup-like containment vessel (13) which collects silica particles from a plurality of burners (14). The containment vessel (13) rotates and oscillates relative to the burners (14) as the boule (19) is formed. The containment vessel (13) is bounded by a cup-like containment wall (22), and a shadow or air flow wall (130) is spaced apart from and surrounds the containment wall (22) forming a gap or air flow passage (175) therebetween. A radially-outwardly extending deflecting wedge portion (23) is formed at the upper extent of the containment wall (22) and at an outlet end of flow passage (175). An upwardly and outwardly tapered surface (131) at the upper end of the air flow wall (130) complements an upwardly and outwardly deflection surface (123) formed on the deflection wedge (23) to form a radially-outwardly and upwardly flow passage (176) for discharging the flow from passage (175). The radially-outwardly and upwardly directed flow passage (176) deflects air infiltrated through the passage (175) outwardly away from the boule (19) so as to reduce and minimize the effects of infiltrated air on the boule.

5 Claims, 2 Drawing Sheets

METHOD AND APPARATUS FOR MINIMIZING AIR INFILTRATION IN THE PRODUCTION OF FUSED SILICA GLASS

This application is a division of 09/487,011 filed Jan. 19, 2000, now U.S. Pat. No. 6,314,766.

FIELD OF THE INVENTION

This invention relates to the production of fused silica glass, and, in particular, to methods and apparatus for improving the homogeneity of such glass, i.e., for reducing variations in the index of refraction of the glass.

DESCRIPTION OF THE TECHNOLOGY

FIG. 1 shows a prior art furnace 100 for producing fused silica glass. In overview, high purity fused silica glass is made by depositing fine particles of silica in a refractory furnace at temperature exceeding 1650° C. The silica particles are generated in a flame when a silicon containing raw material along with natural gas is passed through a burner into the furnace chamber. These particles are deposited on the hot surface of a rotating body where they consolidate into a very viscous fluid which is later cooled to the glassy (solid) state. The rotating body is in the form of a refractory cup or containment vessel which is used to provide insulation to the glass as it builds up, so that the furnace cavity formed by the cup interior and the crown of the furnace is kept at high temperatures. In the art, glass making procedures of this type are known as vapor phase hydrolysis-oxidation processes or simply as flame hydrolysis processes. The body formed by the deposited particles is often referred to as a "boule" and this terminology is used herein, it being understood that the term includes any silica containing body formed by a flame hydrolysis process.

The furnace 100 includes a crown 12 having multiple deposition burners 14, a ring wall 160 which supports the crown, and a rotatable base 18 mounted on an oscillation table 20. The base 18 is rotatable about an axis 3, and the table 20 oscillates in a x-y direction in a plane perpendicular to the axis 3. The crown, ring wall, and base are each made of suitable refractory materials. Preferred patterns for the motion of the x-y oscillation table 20, which can be used in the practice of the present invention, are described in commonly assigned U.S. Pat. No. 5,696,038, entitled "BOULE OSCILLATION PATTERNS OF PRODUCING FUSED SILICA GLASS".

A cup or containment vessel 13 is formed on the base 18 by means of a cup wall or containment wall 22 mounted on the base 18, which forms the cup or containment vessel 13. The cup or containment wall 22 and the portion of the base 18 surrounded by the wall (the bottom of the vessel) is covered with high purity bait sand 24 which collects the initial silica particles. The wall 22 can be composed of refractory blocks such as outer alumina base block 22a and an inner liner 22b made of, for example, zironcia or zircon. Other refractory materials and constructions can, of course, be used if desired.

Surrounding the cup wall 22 of the cup or containment vessel 13 is a shadow wall or air flow wall 130. The shadow wall 130 is mounted on x-y oscillation table 20 by means of feet 140, e.g., by four feet equally spaced around the circumference of the shadow or air flow wall. Other means of mounting the air flow wall to the oscillation table can be used if desired. In general, the mounting means should include spaces for the ingress of air to the space 175 between the cup or containment wall 22 and the shadow or air flow wall 130.

Surrounding the shadow wall 130 is a stationary ring wall 160 which supports the crown 12. A seal 155 is provided between the stationary ring wall 160 and the rotatable and oscillatable shadow or air flow wall 130. The seal 155 comprises an annular plate 150 which rides in or slides in an annular channel 170 formed within the stationary ring wall 160. The annular channel 170 can comprise a C-shaped annular metal plate which forms the bottom of the stationary wall, or other forms of motion accommodating seals can be used if desired, including flexible seals composed of flexible metal or refractory cloth which, for example, can be in the form of a bellows.

The furnace of FIG. 1 employs two gaps around the cup-like containment vessel 13, including a circumferential gap or passage 175 between the containment wall 22 and the shadow or air flow wall 130, which gap permits the flow of cooling air along arrows a into the plenum 26 formed between the crown 12 and the vessel 13. The other gap 165 is formed between the air flow wall 130 and the stationary ring wall 160, and has a variable dimension resulting from the oscillation of the table 20, but does not permit the flow of air as a result of the motion accommodating seal 155. Thus, the air flow around the boule 19 is influenced by the infiltrated air through passage 175 and the inflow from burners 14.

The products of combustion from burners 14 are exhausted through six ports such as 280, that are built around the furnace. As noted in FIG. 1, the furnace is built such that there are three layers of refractory wall between the glass boule 19 and the ambient air. The innermost wall 22, which is part of the cup-like vessel 13, is isolated from the boule by liners 22b such as zircon. The second layer of wall, termed the shadow or air flow wall 130, is separated from the cup-like vessel 13 by a gap of roughly three inches. The outermost layer of wall, termed the stationary ring wall 160, is further separated from the shadow wall 130 by an air gap 165 that roughly measures four inches. The walls are built to provide a furnace cavity where the temperatures as well as the furnace atmosphere can be maintained. Radial and circumferential uniformity of both furnace atmosphere and the temperature is important because it directly effects the quality of glass. Temperature uniformity is important for providing consistency in glass density and refractive index. Compositional uniformity is important in providing the consistency in glass density and the hydrogen dissolved in the boule 19.

Although the horizontal steel plate 150 effectively blocks the gap 165 between the ring wall 160 and the shadow wall 130, the gap 175 between the shadow or air flow wall 130 and the cup containment wall 22 is open so that the ambient air is free to flow from close to the furnace base from the furnace room to the exhaust ports 280. This air flow through passage 175 and into the chamber or plenum 26 of the furnace is necessary to cool down the steel bands which hold the refractory blocks together forming the cup like vessel 13. Without the benefit of such cooling air, the steel bands would expand and slip out of retaining grooves resulting in the vessel 13 falling into pieces.

In order to provide effective removal of the products of combustion from the furnace cavity or plenum 26, the six port boxes 280 are maintained at a negative pressure. Because air is free to move through the circumferential passage 175 between the cup or containment wall 22 and the shadow or air flow wall 130, the furnace exhaust consists of gases from burners 14 pulled out of the furnace cavity 26 and the air pulled through the gap or passageway 175 as indicated by arrows a. Because of the flow patterns created near the rim of the cup vessel 13 it became clear that a portion of the air that was being pulled up through the passage 175 was in fact entering the furnace cavity 26. Gas composition measurements carried out at various radial depths from the inner surface of wall 22, indicated that the products of combustion were being diluted by the infiltrated air, but that the concentration of $CO_2$ increased as the sampling probe was inserted radially deeper into the furnace cavity. Thus, it became apparent that the effect of the infiltrated air flow through passage 175 on the homogeneity of the boule 19 was that rim portions were influenced to a greater degree than central portions. The adverse effect of the entrained air through passage 175 is twofold. Firstly, it cools the products of combustion near the rim of the vessel 13 and reduces the gas temperatures in such region. Secondly, the effect is the dilution of the furnace atmosphere which results in the glass close to the outer periphery of the vessel 13 having a different refractive index and less amount of hydrogen dissolved than centrally of the boule. If the glass is cooled by a large magnitude, the result is in an opaque glass on the outside.

SUMMARY OF THE INVENTION

In view of the foregoing, it is an object of this invention to provide improved methods and apparatus for producing silica-containing boules by the flame hydrolysis. In particular it is an object of the invention to improve the homogeneity of such boules. It is a further object of the invention to provide an improved cup or containment vessel design which will enhance uniformity in the refractive index and the dissolved hydrogen in the boule formed therein.

BRIEF DESCRIPTION OF THE DRAWINGS

The drawings of FIGS. 1 and 2 are not intended to indicate scale or relative proportions of the elements shown therein. Like reference characters designate like or corresponding parts in the various figures.

DESCRIPTION OF THE PREFERRED EMBODIMENTS

As discussed above, the present invention relates to methods and apparatus for improving the homogeneity of silica-containing bodies made by vapor deposition techniques. The silica-containing body can be substantially pure fused silica or can contain one or more dopants as desired. In addition, low levels of contaminants may also be present in the body.

Figure 1:
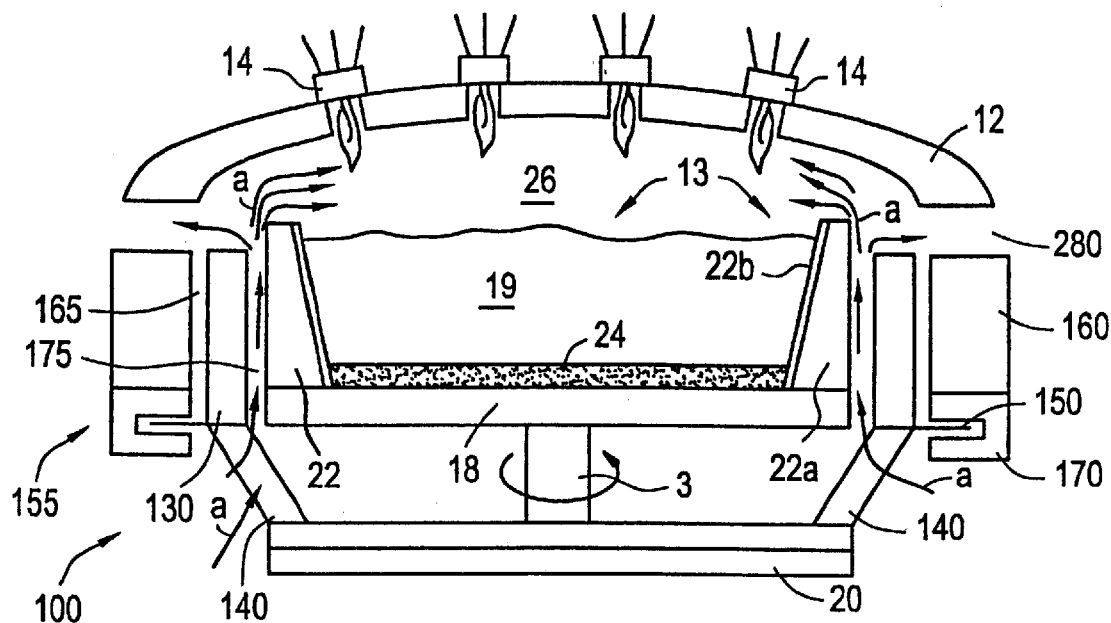
FIG. 1 is a schematic diagram of a prior art furnace used to produce fused silica boules using a flame hydrolysis process.

In accordance with the invention, improved homogeneity, radially from the rim of the boule, is achieved by providing a buffer wedge in the infiltrated air flow passage to redirect a portion of such flow away from the boule, as opposed to the direct air flow entrance of FIG. 1. That is, in order to reduce or minimize the effect of the infiltrated air upon the homogeneity of the boule, the air passage is designed to deflect at least a portion of the flow away from the rim of the boule.

Figure 2:
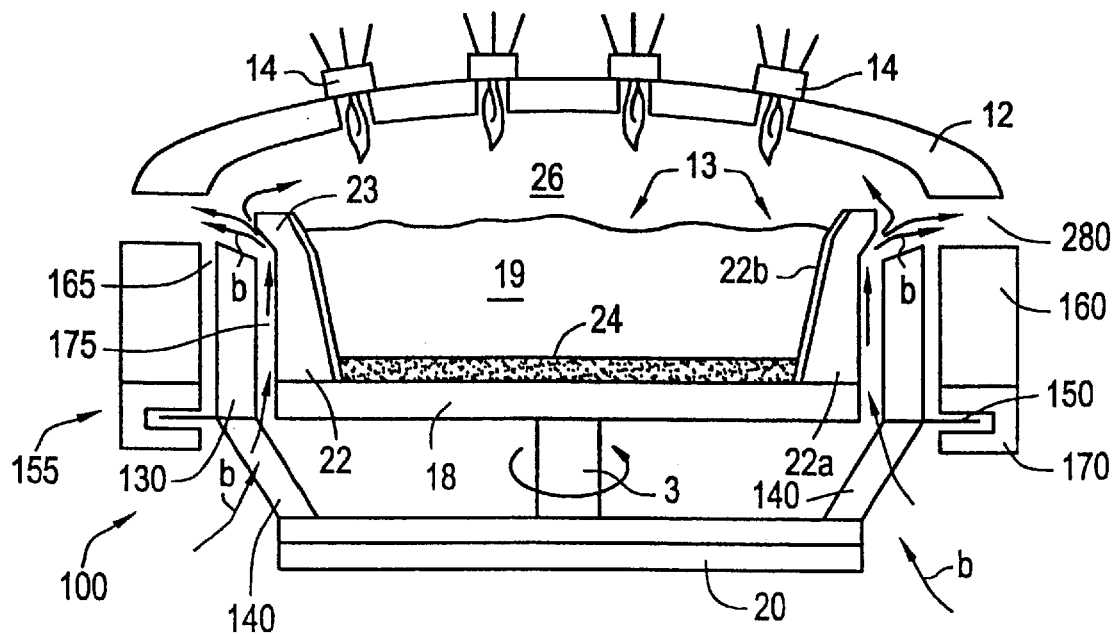
FIG. 2 is a schematic diagram of a furnace constructed in accordance with the present invention.

FIG. 2 shows a furnace 100 constructed in accordance with the present invention. As in the furnace of FIG. 1, furnace 100 includes a cup or containment vessel 13 which collects silica particles produced by burners 14. Base 18, which forms the bottom of the vessel 13, rotates as the boule 19 is formed, and also oscillates through its attachment to oscillation table 20.

Figure 3:
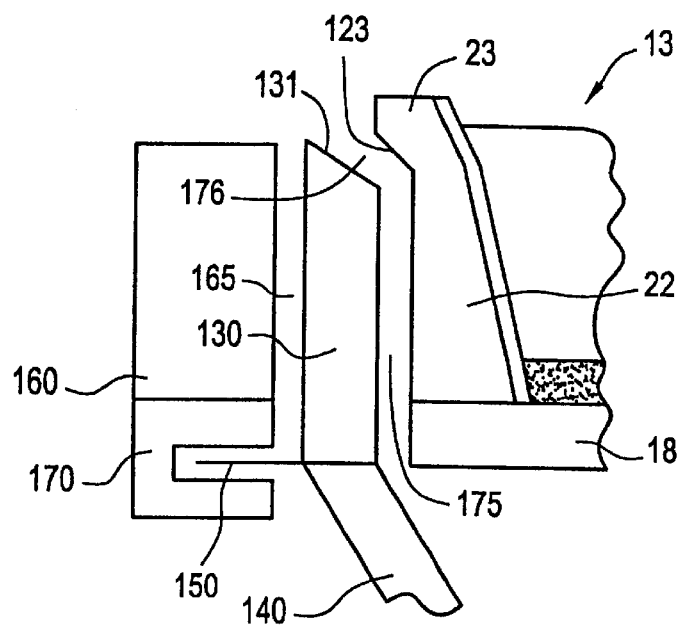
FIG. 3 is an enlarged fragmental view of a portion of the furnace shown in FIG. 2.

As more particularly shown in FIG. 3, a radially-outwardly extending deflecting wedge portion or overhang 23 is provided at the upper extent of the cup or retaining wall 22. The deflecting wedge 23 has an upwardly and outwardly extending deflection surface 123 at an upper outlet end of the infiltration flow passageway 175. The upper extent of the shadow or air flow wall 130 is provided with an upwardly and outwardly tapered surface 131. Accordingly, the flow passage 175 for infiltrated air terminates at its outlet end in a radially outwardly and upwardly flow passage 176 between the tapered surface 131 and deflection surface 123. The shadow wall 130 extends upwardly to about the height of the deflection surface 123, so as to channel the infiltrated air in passage 175 up to the deflection wedge portion 23, and thereby direct such infiltrated air radially-outwardly through flow passage 176 and away from the boule 19. As noted by arrows b of FIG. 2, the deflecting wedge portion 23 functions to deflect a portion of the infiltrated air from passage 175 toward the exhaust ports and thereby minimizes or reduces the effects of air infiltration on the boule 19.

Figure 4:
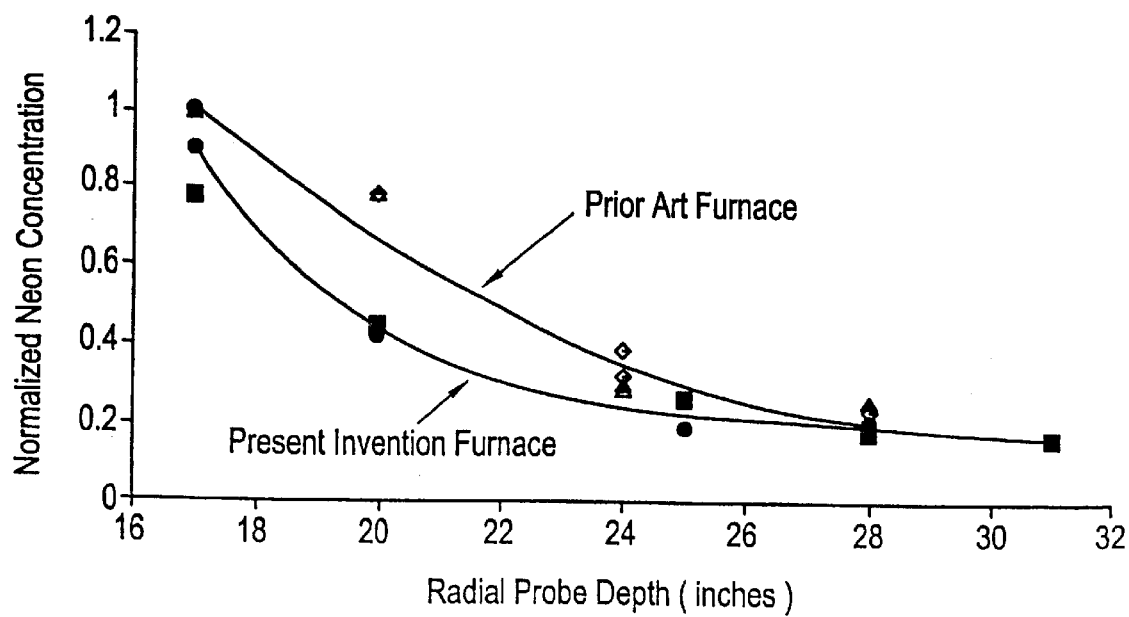
FIG. 4 is a plot showing the comparison of an infiltrated gas within a furnace of the prior art construction, with a furnace constructed in accordance with the present invention.

In order to evaluate the impact of the new design of the present invention as shown in FIG. 2 and FIG. 3, as compared with the prior art configuration of FIG. 1, neon tracer studies were conducted. Neon gas was diffused into the furnaces via an inlet end of passageway 175, and probes were inserted into the vessel 13 at various radial depths from the rim to measure the neon concentration radially-inwardly of the vessel or cup 13 from the rim. FIG. 4 is a graph illustrating the concentration of neon at various radial depths from the rim of the vessel 13 in both the prior art furnace configuration and the improved configuration of the present invention. As can be seen from the plot of FIG. 4, the neon concentrations with the improved design of the present invention level off at a radial probe depth of about 24 inches, as compared to about 28 inches in the prior art furnace. This data indicates that, by utilizing the improved construction of the present invention, the influence of entrained air on the furnace atmosphere has been reduced by a radial depth of about four inches, thus providing for a boule with a larger area of homogeneity. The increased utilization of the boule has been achieved by the deflecting wedge portion of the present invention reducing the influence of infiltrated air on the boule. Accordingly, the amounts of dissolved hydrogen adjacent the periphery of the glass boule and centrally thereof are now more uniform than that achieved in the prior art. Thus, the glass made with the new design not only provides for better uniformity in refractive index but also in dissolved hydrogen, and accordingly results in increased glass utilization.

Although we have disclosed the now preferred embodiments of our invention, additional embodiments may be perceived by those skilled in the art without departing from the spirit and scope of the invention as defined in the following claims.

We claim:

1. A method of reducing the detrimental effect of furnace infiltrated air on the homogeneity of newly formed silica glass which comprises:

forming silica glass by flame hydrolysis, within a furnace cavity, providing a circumferential passage for air flow externally about the furnace cavity in space relation from and out of contact with formed glass, and deflecting at least a portion of the air flow within the circumferential passage radially outwardly away from contact with the formed glass within the furnace cavity and reducing the effects therof on the homogeneity of the glass.

2. A method of reducing the detrimental effect of furnace infiltrated air on the homogeneity of newly formed silica glass as defined in claim 1 and providing improved uniformity of dissolved hydrogen in the glass including the step of flowing the air from the circumferential passage into a radially-outwardly and upwardly extending flow passage away from the formed glass, to thereby reduce the effect of said infiltrated air and promote uniformity of dissolved hydrogen in the formed glass.

3. A method of reducing the detrimental effect of furnace infiltrated air on the homogeneity of newly formed silica glass as defined in claim 1 including the steps of providing an upwardly and outwardly deflection surface at an outlet end of the circumferential flow passage, and impinging the flow from the circumferential passage thereon to deflect such flow radially outwardly away from the formed glass and thereby reduce the effects of the air on the homogeneity of the glass.

4. A method of reducing the detrimental effect of furnace infiltrated air on the homogeneity of newly formed silica glass as defined in claim 1 including the steps of forming a radially-outwardly and upwardly directed flow passage at an outlet end of the circumferential flow passage, deflecting the air flow from the circumferential flow passage into the radially-outwardly and upwardly directed flow passage, and flowing the air therefrom outwardly away from the formed glass to lessen the effects thereon the glass.

5. A method of reducing the detrimental effect of furance infiltrated air on the homogeneity of newly formed silica glass as defined in claim 1 including the steps of forming a radially-outwardly and upwardly directed flow passage at an outlet end of the circumferetial flow passage, deflecting the air flow from the circumferetial flow passage into the radially-outwardly and upwardly directed flow passage, and flowing the air therefrom outwardly away from the formed glass to lessen the effects thereon the glass.

* * * * *